United States Patent [19]

Boutmy et al.

[11] 4,196,315
[45] Apr. 1, 1980

[54] DIGITAL MULTIPLEXING AND DEMULTIPLEXING SYSTEM

[75] Inventors: Patrick E. Boutmy; Michel Stutzmann; Jean G. Walraet, all of Lannion, France

[73] Assignee: Societe Anonyme de Telecommunications, Paris, France

[21] Appl. No.: 926,960

[22] Filed: Jul. 21, 1978

[30] Foreign Application Priority Data

Jul. 26, 1977 [FR] France .................. 77 22880

[51] Int. Cl.² .................................... H04J 3/06
[52] U.S. Cl. ..................................... 370/102
[58] Field of Search ................. 179/15 AF, 15 BV

[56] References Cited

U.S. PATENT DOCUMENTS

| | | | |
|---|---|---|---|
| 3,569,631 | 3/1971 | Johannes | 179/15 AF |
| 3,931,473 | 1/1976 | Ferris | 179/15 AF |
| 3,987,248 | 10/1976 | Platet | 179/15 AF |

OTHER PUBLICATIONS

Transmission Systems for Communications; Staff, Bell Telephone Laboratories; 4th Ed., 1970, pp. 143-145.

*Primary Examiner*—David L. Stewart
*Attorney, Agent, or Firm*—Abraham A. Saffitz

[57] ABSTRACT

A digital multiplexing and demultiplexing system for time division multiplexing a number of incoming plesiosynchronous low rate component signals and a number of incoming plesiosynchronous intermediate rate component signals into an outgoing single high rate signal. A first multiplexing stage time stores and stuffs the low rate component signals and multiplexes them into synchronous intermediate rate signals. A second multiplexing stage stores and stuffs the plesiosynchronous and synchronous intermediate rate signals and multiplexes them into the outgoing high rate signal.

1 Claim, 8 Drawing Figures

DIGITAL MULTIPLEXING AND DEMULTIPLEXING SYSTEM

CROSS REFERENCE TO RELATED APPLICATIONS

Applicants hereby make cross references to their French patent application No. PV 77 22880 filed July 26, 1977 and claim priority thereunder folowing the provisions of 35 U.S.C. 119.

BACKGROUND OF THE INVENTION

1. Field of the invention

This invention relates to a digital multiplexing and demultiplexing system.

2. Description of the Prior Art

Digital multiplexing and demultiplexing are a concept known in the prior art and has been described, for instance, in paper entitled "Experimental 224 Mb/s digital multiplexer-demultiplexer using pulse stuffing synchronization" by F. J. WITT in the "Bell System Technical Journal", November 1965, pages 1843–1885 and in a paper entitled "Digital multiplexing systems" by Yvon MADEC in "Echo des Recherches", January 1973, pages 59–67. Digital multiplexing systems or multiplexers provide multiplexing by the time slotting of component digital signals of one rate into a single digital resulting signal of a higher rate. Digital demultiplexing systems or demultiplexers provide the converse operation. The resulting signal must contain a special recurrent signal which is called the framing signal and which gives the demultiplexer a reference.

In the case of an asynchronous network the clocks of the component signals are independent, but may be plesiosynchronous, i.e. they all have the same rated frequency and variations therearound are confined within specified limits. Before time multiplexing can be carried out the component signals must be made synchronous with one another. The usual procedure is to equalize the rates upwards converting each component signal to a bit rate slightly above its nominal rate. The difference between the rates is filled up in the converted signal by additional bits called stuffing bits. The multiplexing of the stuffed signals is called positive stuffing multiplexing.

The demultiplexer is also required to recognize and remove the stuffing bits associated with each component signal so as to restore it properly. Accordingly, the stuffing bits, if present, have a definite position in the frame (the frame is the interval separated by two consecutive framing signals) and their presence or absence is indicated by the logical value of special (systematically inserted) filling bits called "stuffing indication bits".

If N denotes the number of plesiosynchronous component signals to be multiplexed, $F_e$ denotes their nominal rate and $F_s > NF_e$ denotes the nominal rate of the resulting signal, then:

$$F_s = NF_e(1+\epsilon)(1+P/Q) \qquad (1)$$

where Q denotes the number of information bits per frame, P denotes the number of filling bits (framing, stuffing indication and, where applicable, service bits) per frame and $F_d = \epsilon F_e$ denotes the nominal stuffing rate.

A multiplexing and demultiplexing system allots to a predetermined number of incoming component digital channels at a predetermined rate a single digital resulting channel at a different predetermined rate. The rates of the digital channels are defined by national telecommunication authorities and are called master rates; some rates also are defined internationally. One passes generally from a low master rate to the high master rate immediately superior directly by means of a multiplexing stage, there being a single relationship between the master rates of the component signals and the resulting signal.

Such a multiplexing and demultiplexing operation is disclosed in U.S. Pat. No. 3,987,248 issued Oct. 19, 1976 to Frederic M. Platet, Yvon N. Madec and Patrick E. Boutmy. In this patent, incoming digital component signals are time division multiplexed into a digital resulting signal having a high rate. Thus sixteen plesiosynchronous incoming component 8 Mb/s signals are time multiplexed into a resulting digital signal having the 140 Mb/s high rate. This resulting signal can be demultiplexed, of course, into sixteen outgoing digital component 8 Mb/s signals but also into four 34 Mb/s intermediate rate digital signals. However, it is not possible to time multiplex at the same time the plesiosynchronous 8 Mb/s low rate component signals and one or several plesiosynchronous 34 Mb/s intermediate rate component signals.

OBJECT OF THE INVENTION

The object of the present invention is to provide a digital multiplexing and demultiplexing system for multiplexing a number of plesiosynchronous component signals having a nominal low rate and a number of plesiosynchronous component signals having a nominal intermediate rate into a single resulting signal having a nominal high rate which is slightly multiple of the nominal low and intermediate rates.

SUMMARY OF THE INVENTION

According to this invention, there is provided a digital multiplexing and demultiplexing system in which a number of incoming plesiosynchronous low rate component signals having respective originating rates departing from a predetermined nominal low rate which is slightly higher than all said originating rates are time multiplexed bit by bit into synchronous intermediate rate signals and a number of incoming plesiosynchronous intermediate rate component signals having respective originating rates departing from a predetermined nominal intermediate rate which is slightly higher than said originating rates are time multiplexed bit by bit with said synchronous intermediate rate signals into an outgoing single rate signal having a high rate which is slightly multiple of said originating intermediate rates, said low rate signals and said plesiosynchronous intermediate rate signals comprising only information bits and said synchronous intermediate rate signals and said high rate signal comprising information bits, stuffing bits and filling bits including framing bits, service bits and stuffing indication bits arranged in predetermined bit positions in frames, the system comprising:

a—first means for storing said low rate component signals;

b—means for stuffing said low rate component signals in dependence upon the difference between their own originating respective low rates and said nominal low rate;

c—multiplexing means receiving the signals read out of said storing means and multiplexing said nominal low rate stuffed signals into frames of said synchronous intermediate rate signals;

d—means for inserting into said synchronous intermediate rate signals a first number of filling bits in bit positions of predetermined addresses of the frame thereof and thereby forming synchronous intermediate rate filled signals;

e—second means for storing said synchronous intermediate rate filled signals;

f—third means for storing said plesiosynchronous intermediate rate component signals;

g—means for stuffing said synchronous intermediate rate filled signals and said plesiosynchronous intermediate rate component signals in dependence upon the difference between their own originating respective intermediate rates and said nominal intermediate rate;

h—multiplexing means receiving the signals read out of said second and third storing means and multiplexing said nominal intermediate rate stuffed signals into frames of said high rate signal; and i—means for inserting into said high rate signal a second number of filling bits in bit positions of predetermined addresses of the frame thereof and thereby forming a high rate filled signal.

A digital multiplexing system embodying this invention provides a digital resulting signal having a 34 Mb/s high rate from time multiplexing of sixteen plesiosynchronous digital incoming component signals having a 2 Mb/s low rate but also from time multiplexing of:

twelve plesiosynchronous incoming 2 Mb/s signals and one incoming 8 Mb/s signal;

eight plesiosynchronous incoming 2 Mb/s signals and two plesiosynchronous incoming 8 Mb/s signals; or four plesiosynchronous incoming 2 Mb/s signals and three plesiosynchronous incoming 8 Mb/s signals.

In each case, the digital time demultiplexing system embodying this invention which is associated with the corresponding multiplexing system embodying this invention permits to recovery at the receiver the outgoing component signals having rates equal to these of the incoming component signals at the transmitter.

Bit stuffing is an operation associated with time division multiplexing to be used each time the signals to be time division multiplexed originate from unsynchronized sources. In the case of two multiplexing stages, for example a first multiplexing stage of 8 into 34 Mb/s and a second multiplexing stage of 34 into 140 Mb/s or a first multiplexing stage of 2 into 8 Mb/s and a second multiplexing stage of 8 into 34 Mb/s, there are provided two groups of storage and stuffing circuits. The first group stuffes the plesiosynchronous low rate component signals having 2 or 8 Mb/s rate and the second group stuffes the intermediate rate signals having 8 or 34 Mb/s rate.

When the high rate signal having a 34 or 140 Mb/s rate is provided from time multiplexing of synchronous intermediate rate signals which are originated from time multiplexing of plesiosynchronous incoming low rate signals, and of plesiosynchronous incoming intermediate rate signals, the multiplesing system of this invention stuffes the synchronous intermediate rate signals as well as the plesiosynchronous intermediate rate signals into synchronous stuffed intermediate signals. Nevertheless, when plesiosynchronous incoming low rate signals are only time multiplexed it is necessary to stuff the resulting synchronous intermediate rate signals. In fact, if $F_c$ denotes the nominal intermediate rate and $F_s > NF_c$ denotes the nominal high rate of the resulting signal for N plesiosynchronous and/or synchronous intermediate rate signals to be multiplexed, then:

$$F_s/N(1+P/Q) > F_c$$

and the resulting high rate signal 34 or 140 Mb/s can be demultiplexed by means of a demultiplexing system 34-8 Mb/s or 140-34 Mb/s for the countries having the 34 or 8 Mb/s rate as intermediate master rate.

The foregoing and other objects, features and advantages of the present invention will be become apparent from the following more particular description of preferred embodiments of the invention as illustrated in the accompanying drawing.

DESCRIPTION OF THE PREFERRED EMBODIMENTS

Figure 1:
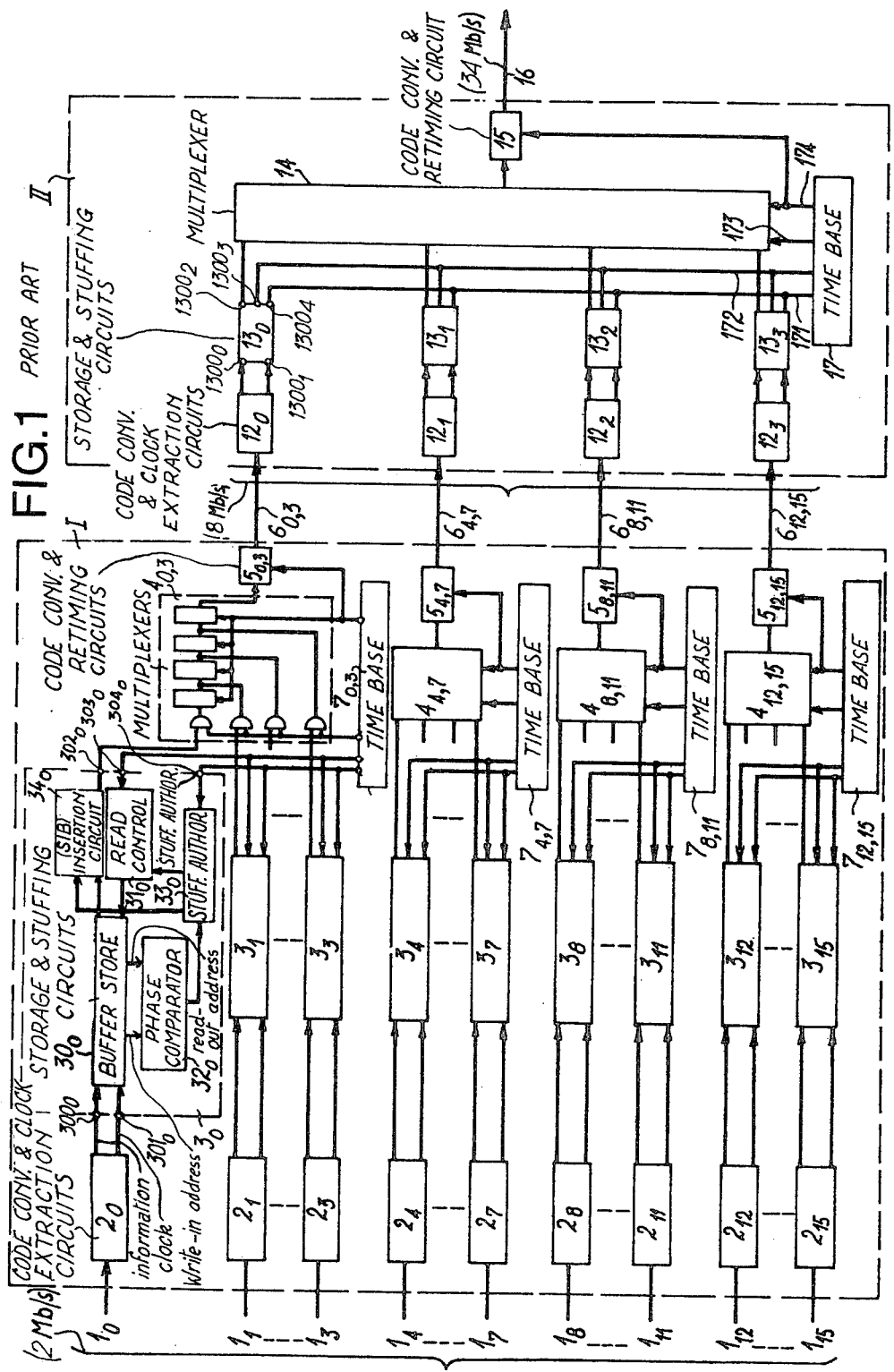
FIG. 1 shows a prior art two-stage digital multiplexing system.

FIG. 1 illustrates a prior art digital multiplexer having two multiplexing stages I and II. $1_0$ through $1_{15}$ designate sixteen incoming channels $1_0$ through $1_{15}$ having a nominal 2.048 Mb/s rate. In a first multiplexing stage I the incoming channels extend to code conversion and clock signal extraction circuits $2_0$ through $2_{15}$ respectively each having two output terminals, one for the digital information and the other for the clock signal. The code conversion and clock signal extraction circuits $2_0$ through $2_{15}$ perform in known manner the distinct functions of converting the incoming signals from the code used on the incoming channels $1_0$ through $1_{15}$ to the binary code used by the digital multiplexer, of shaping the incoming channel signals and of extracting the clock signal. By way of example, the first function is carried out by a HDB3-binary transcoder. The $HDB_3$ code is well known in the art and is for example disclosed in the paper of the C.C.I.T.T., Special Committee D, Contribution No. 33, 23rd September 1969. Each code conversion and clock signal extraction circuit $2_0$ through $2_{15}$ is connected to a respective storage and positive stuffing circuit $3_0$ through $3_{15}$.

Only the circuit $3_0$ is shown in detail in FIG. 1. It comprises a buffer store $30_0$ having a write-in input terminal $300_0$ connected to the digital information output terminal of circuit $2_0$, and a write-in progression input terminal $301_0$ connected to the clock signal output terminal of circuit $2_0$. Store $30_0$ comprises a read output terminal $302_0$ and a read progression input terminal $303_0$, the latter receiving a signal from a time $7_{0,3}$ by way of a read control circuit $31_0$. The write-in address output terminal and the read-out address output terminal of the buffer store $30_0$ are connected to a phase comparator $32_0$ whose output is connected to a stuffing authorisation circuit $33_0$. This stuffing authorisation circuit $33_0$ is connected to the time base $7_{0,3}$ which via terminal $304_0$ transmits to circuit $33_0$ clock pulses coinciding with the bit positions in the frame assigned to the stuffing bits. Circuit $33_0$ is connected to the read control circuit $31_0$ which receives a reading control signal from the time base $7_{0,3}$ via terminal $303_0$. Read control circuit $31_0$ is inhibited when it receives stuffing authorisation signals. The read output terminal of the buffer store is connected to a stuffing indication bit insertion circuit $34_0$ which inserts the stuffing indication bits into the stuffed channel in accordance with the order received from the circuit $33_0$.

The digital information output terminals such as $302_0$ of the storage and positive stuffing circuits $3_0$ through $3_3$ are connected to the inputs of a multiplexer $4_{0,3}$ controlled by time base $7_{0,3}$. The single output of the multiplexer $4_{0,3}$ is connected to a code conversion and retiming circuit $5_{0,3}$. The multiplexers $4_{0,3}$, $4_{4,7}$, $4_{8,11}$ and $4_{12,15}$ are parallel-to-series converters such as shift registers which receive the low-rate signals for multiplexing in parallel and deliver them in series at a high rate which in the present case is the intermediate rate while inserting the framing signal at the beginning of each frame. Each multiplexer receives from its own time base the 2 Mb/s sync signal and the 8 Mb/s sync signal. Multiplexer $4_{0,3}$ also comprises AND gate for the insertion into the frame of framing, stuffing indication and service bits.

At the output of the first multiplexing stage I there are the code conversion and retiming circuits $5_{0,3}$, $5_{4,7}$, $5_{8,11}$ and $5_{12,15}$. Extending from the code conversion and retiming circuits are 8 Mb/s digital channels $6_{0,3}$, $6_{4,7}$, $6_{8,11}$ and $6_{12,15}$. The code conversion and retiming circuits perform the functions of converting from the binary code used by the digital multiplexers to the code used by channels $6_{0,3}$ through $6_{12,15}$ by way of a binary-HDB 3 transcoder, of shaping the multiplexed signals, and of retiming.

The output digital channels of the first multiplexing stage I are connected to code conversion and clock signal extraction circuits $12_0$ through $12_3$ of a second multiplexing stage II. The second stage II is very similar to the first stage I except that it multiplexes four digital input channels into a single digital output channel instead of multiplexing four times four channels. In addition to the code conversion and clock signal extraction circuits $12_0$ through $12_3$ the stage II comprises storage and positive stuffing circuits $13_0$ through $13_3$, a multiplexer 14, a code conversion and retiming circuit 15 and a time base 17. Output channel 16 has a rate of 34 Mb/s.

Figure 2:
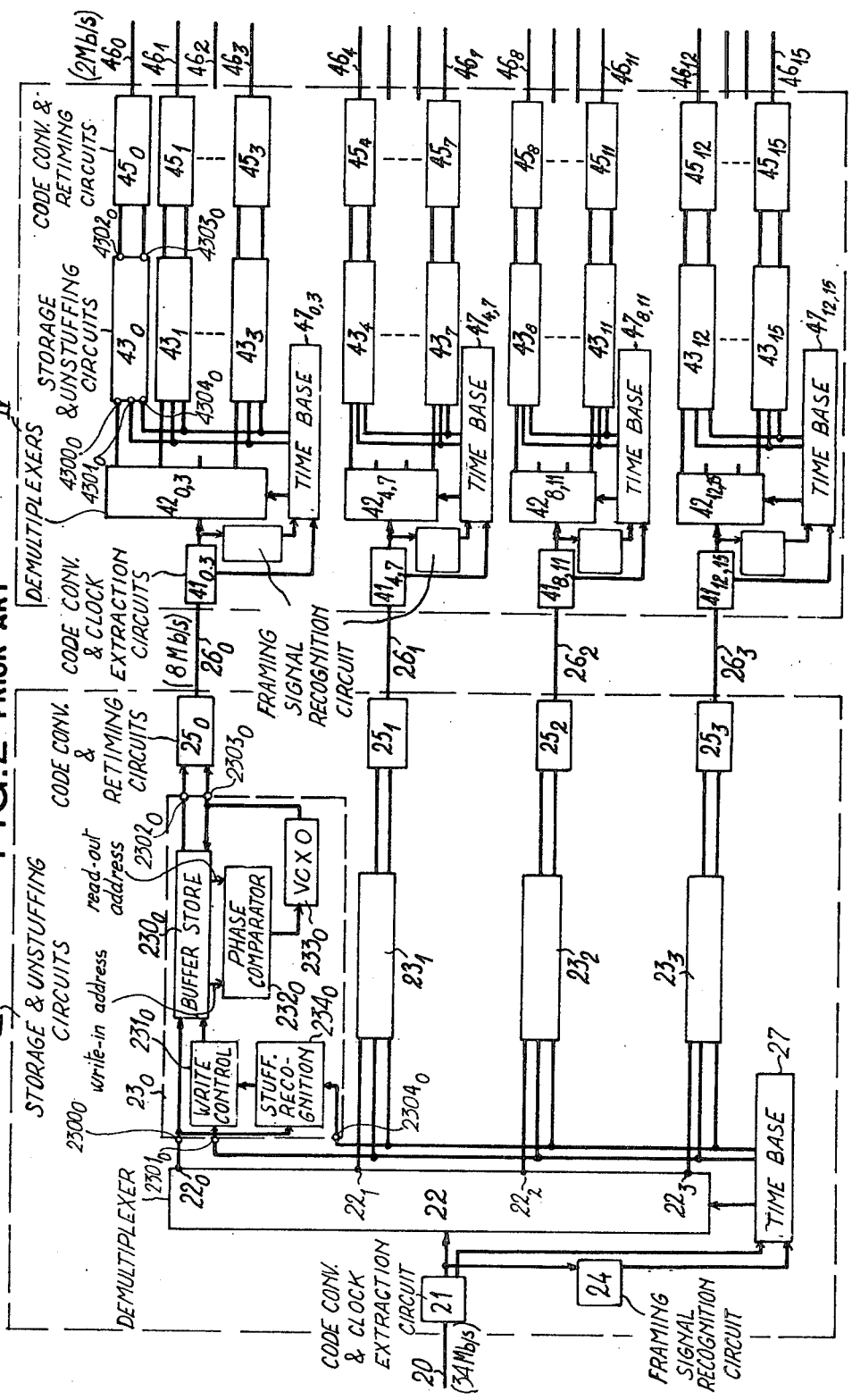
FIG. 2 shows a prior art two-stage digital demultiplexing system.

Referring now to FIG. 2, a prior art digital demultiplexer has a 34 Mb/s digital channel 20 which extends in the first demultiplexing stage III to a code conversion and clock signal extraction circuit 21 delivering the digital information signal and the clock signal on separate output terminals. The information output terminal of the circuit 21 is connected to a framing signal recognition circuit 24 which synchronizes a time base 27. The information signal is applied to the demultiplexer 22 which has four output terminals $22_0$ through $22_3$, and the timing signals goes to the time base 27. Each output terminal of the demultiplexer 22 is connected to a respective storage and unstuffing circuits $23_0$ through $23_3$. Only the circuit $23_0$ is shown in detail in FIG. 2. The circuit $23_0$ comprises a buffer store $230_0$ having a write-in input terminal $2300_0$ connected to the demultiplexer output terminal $22_0$ and a write-in progression input terminal $2301_0$ connected to time base 27 by way of a write-in control circuit $231_0$. The write-in control circuit $231_0$ also receives a signal from a stuffing recognition circuit $234_0$ which is also connected to the write-in input terminal $2300_0$ and which receives from the time base 27 via the input terminal $2304_0$ a stuffing indication bit address signal. The buffer store can have e.g. eight stages. The buffer store $230_0$ comprises a read-out output terminal $2302_0$ and a read-out progression input terminal $2303_0$. The write-in and read-out address output terminals of the buffer store $230_0$ are connected to a phase comparator $232_0$ whose output terminal is connected to a circuit $233_0$ comprising a low-pass filter and a voltage-controlled oscillator. The output terminal of the oscillator controls the reading of the buffer store.

The digital information output terminals such as $2303_0$ of the storage and unstuffing circuits $23_0$ through $23_3$ are connected to code conversion and retiming circuits $25_0$ through $25_3$ which receive the 8 Mb/s clock signal from each voltage-controlled oscillator $233_0$ through $233_3$ respectively via an output terminal such as $2303_0$. 8 Mb/s digital channels $26_0$ through $26_3$ extend from the code conversion and retiming circuits $25_0$ through $25_3$.

The digital output channels $26_0$ through $26_3$ of the first demultiplexing stage III are connected to code conversion and clock signal extraction circuits $41_{0,3}$ through $41_{12,15}$ of the second demultiplexing stage IV. The same is very similar to the first demultiplexing stage III except that it demultiplexes four digital input channels into sixteen digital output channels instead of demultiplexing a single digital input channel into four digital output channels. In addition to the code conversion and clock signal extraction circuits $41_{0,3}$, $41_{4,7}$, $41_{8,11}$ and $41_{12,15}$, it comprises four demultiplexers $42_{0,3}$, $42_{4,7}$, $42_{8,11}$ and $42_{12,15}$, sixteen storage and unstuffing circuits $43_0$ through $43_{15}$ and sixteen code conversion and retiming circuits $45_0$ through $45_{15}$. Output channels $46_0$ through $46_{15}$ of the latter circuits have a rate of 2 Mb/s. Time bases $47_{0,3}$, $47_{4,7}$, $47_{8,11}$ and $47_{12,15}$ control the demultiplexers and the storage and unstuffing circuits.

Before describing the digital multiplexer and demultiplexer of the system embodying this invention, a description will be given of multiplex frame structures of the 8 Mb/s and 34 Mb/s signals to assist understanding of the structure and operation of the multiplexer and demultiplexer embodying the invention.

Figure 3:
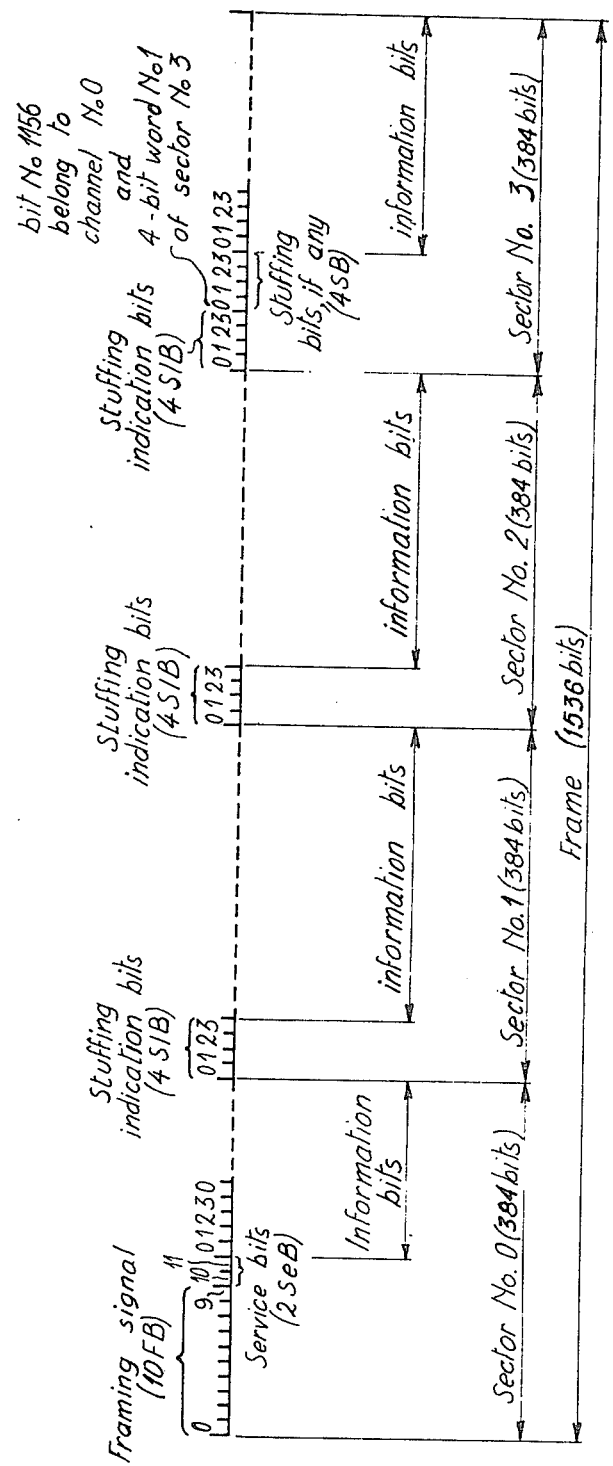
FIG. 3 is a chart illustrating one frame of a high rate 34 Mb/s signal.

FIG. 3 shows the structure of a 34 Mb/s digital signal recommended by the C.C.I.T.T. The frame comprises four sectors, numbered 0 to 3, each containing 384 bits, every sector except the first starting with four stuffing indications bits (SIB). The stuffing bits (SB), if any, are in the four bit positions following the stuffing indication bits of the fourth section No. 3. The framing bits (FB) are the first ten bits of the first sector and are followed by two service bits (SeB). In a frame, the number of filling bits which correspond to ten framing bits (FB), two service bits (SeB) and $3 \times 4 = 12$ stuffing indication bits (SIB) is equal to P=24, the number of stuffing bits is equal to 4 and the number of information bits originating from 8 Mb/s signal is $Q=(384\times 4)-(24+4)=1508$ in a 1536-bit frame.

A bit position in the 1536-bit frame is defined by an address having three address parts. A first address part is equal to the remainder, between 0 and 3, of the division of the bit position number, between 0 and 1535, in the frame by 4. This first address indicates the number 0, 1, 2 or 3 of the incoming 8 Mb/s channels $6_{0,3}$, $6_{4,7}$, $6_{8,11}$ or $6_{12,15}$ to which the considered bit belongs. A second address part is equal to the remainder, between 0 and 95, of the division of the quotient, between 0 and 383, of the preceding division by 96. This second address part indicates the number, between 0 and 95, of the 4-bit word in the sector to which the considered bit belongs. Finally, the third address part is equal to the remainder, between 0 and 3, of the division of the quotient, between 0 and 3, of the last preceding division by 4. This third address part indicates the number, between 0 and 3, of the sector to which the considered bit belongs. For example, the first stuffing bit which has the position number 1156 in the 1536 bit frame is defined by the three following address parts:

$1156=4\times 289+0$; first address part=0
$289=96\times 3+1$; second address part=1
$3=4\times 0+3$; third address part=3

Thus the bit of position No. 1156 belongs to the incoming 8 Mb/s channel No. 0 and the 4-bit word No. 1 of the sector No. 3.

Figure 4:
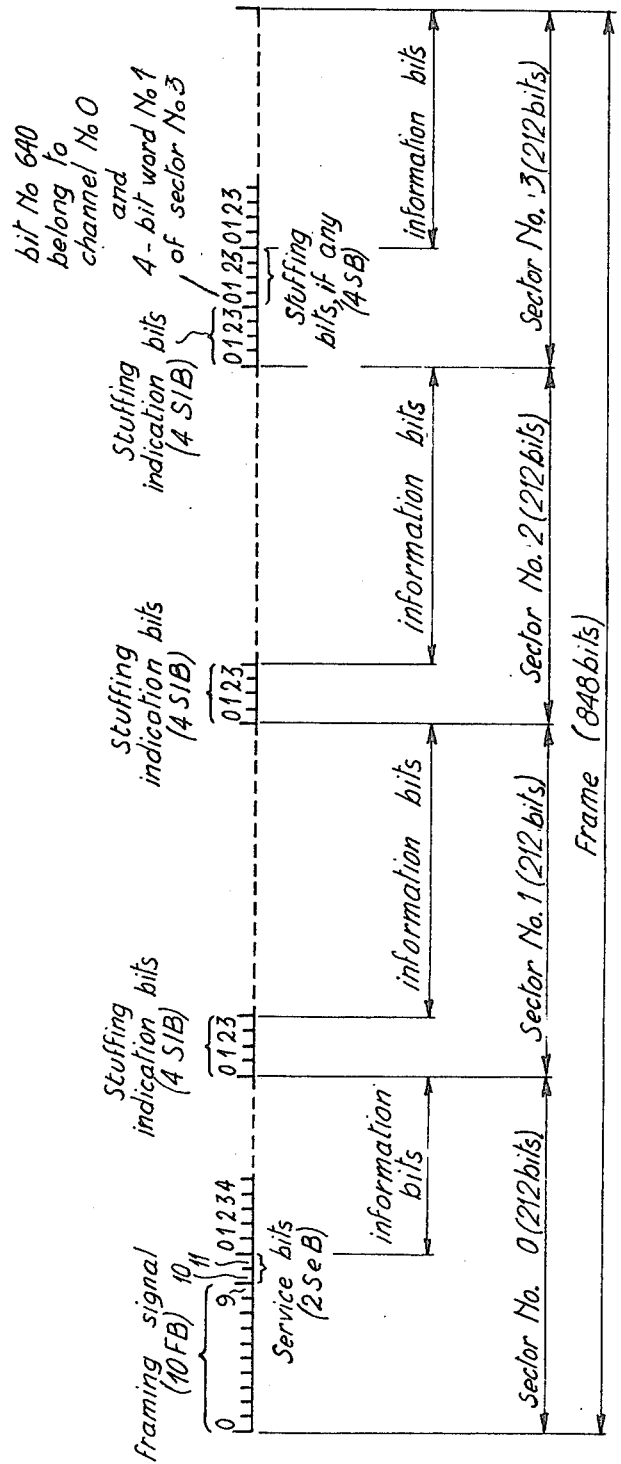
FIG. 4 is a chart illustrating one frame of an intermediate rate 8 Mb/s signal.

FIG. 4 illustrates the structure of a 8 Mb/s digital signal recommended by the C.C.I.T.T. The frame comprises four sectors, numbered 0 to 3, each containing 212 bits, every sector except the first starting with four stuffing indication bits (SIB). The stuffing bits (SB), if any, are in the four bit positions following the stuffing indication bits of the fourth sector No. 3. The framing bits (FB) are the first ten bits of the first sector and are followed by the service bits (SeB). In a 848-bit frame, the number of filling bits which correspond to ten framing bits (FB), two service bits (SEB) and $3\times 4=12$ stuffing indication bits (SIB) is equal to P=24 and the number of stuffing bits is equal to 4. The number of information bits originating from four 2 Mb/s signals is $Q=(212\times 4)-(24+4)=820$ in a 848-bit frame.

A bit position in the 848-bit frame is defined by an address having three address parts in a similar manner to bit address in the preceding 1536-bit frame. A first address part is equal to the remainder, between 0 and 3, of the division of the bit position number, between 0 and 847, in the 848-bit frame by 4. This first address part indicates the number 0, 1, 2 or 3 of the four incoming 2 Mb/s channels to which the considered bit belongs. A second address part is equal to the remainder, between 0 and 52, of the division of the quotient, between 0 and 211, of the preceding division by 53. This second address indicates the number, between 0 and 52, of the 4-bit word in the sector to which the considered bit belongs. Finally, the third address part is equal to the remainder, between 0 and 3, of the division of the quotient, between 0 and 3, of the last preceding division by 4. This third address part indicates the number, between 0 and 3, of the sector to which the considered bit belongs. For example, the first stuffing bit which has the position number 640 in the 848-bit frame is defined by the following address parts:

$640=4\times 160+0$; first address part=0
$160=53\times 3+1$; second address part=1
$3=4\times 0+3$; third address part=3

Thus the bit of position No. 640 belongs to the incoming 2 Mb/s channel No. 0 and the 4-bit word No 1 of the sector No. 3.

The addresses of the first stuffing bit are identical in the 1536-bit frame of the 34 Mb/s digital channel and the 848-bit frame of a 8 Mb/s digital channel.

Figure 5:
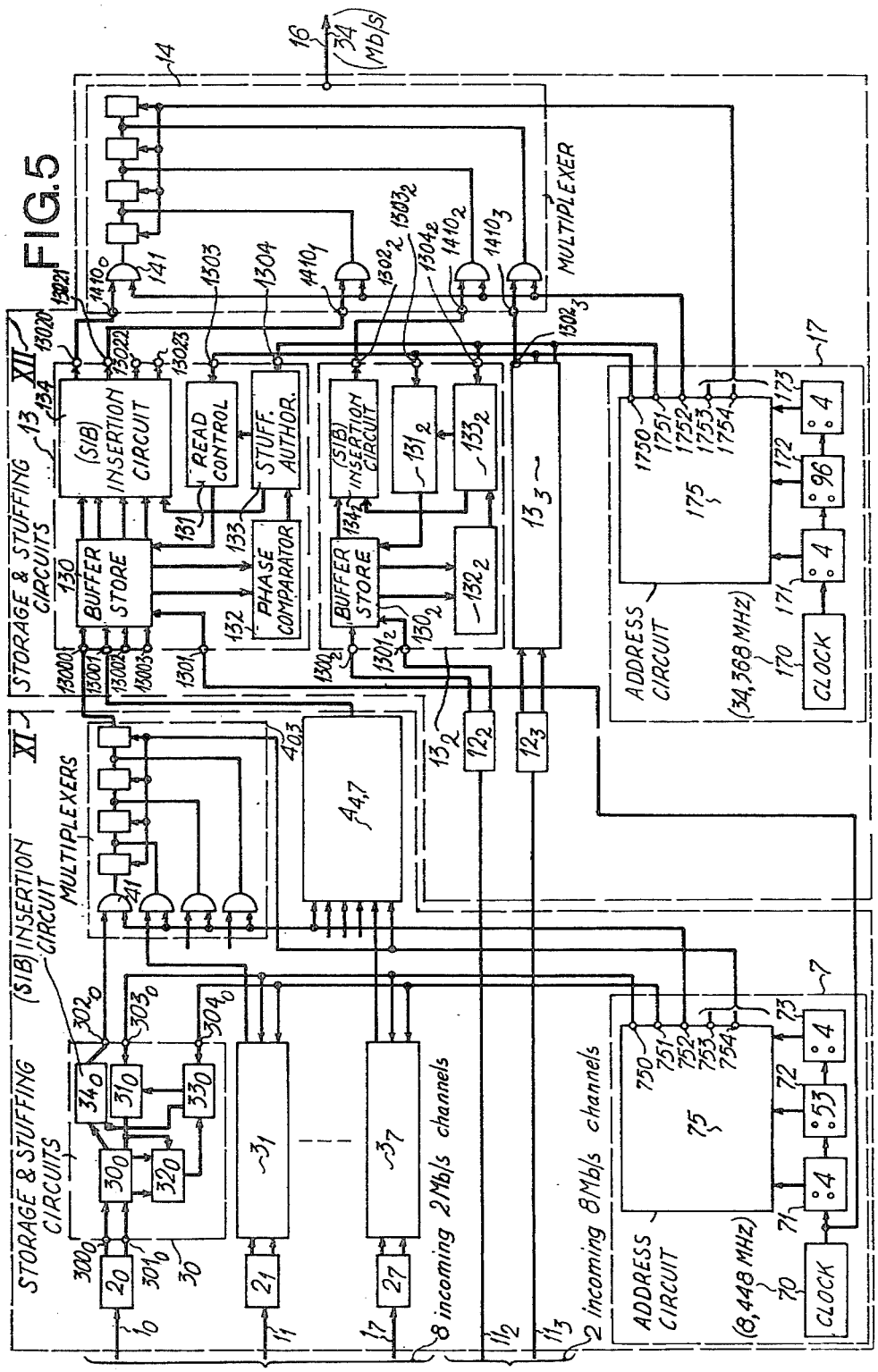
FIG. 5 shows a two-stage digital multiplexing system embodying this invention.

Referring to FIG. 5, the digital multiplexing system embodying the present invention is distinguished from the prior art multiplexer by the multiplexing of eight plesiosynchronous incoming digital 2,048 Mb/s channels $1_0$ through $1_7$ instead of sixteen and by the direct receiving of two plesiosynchronous incoming digital 8 Mb/s channels $11_2$ and $11_3$. In the first multiplexing stage XI, the two groups of four 2,048 Mb/s channels $1_0$ through $1_3$ and $1_4$ through $1_7$ extend to two groups of circuits in a similar manner to those shown in FIG. 1. Each group of circuits comprises four code conversion and clock signal extraction circuits $2_0$ through $2_3$ or $2_4$ through $2_7$, four storage and positive stuffing circuits $3_0$ through $3_3$ or $3_4$ through $3_7$ and a multiplexer $4_{0,3}$ or $4_{4,7}$ respectively. The two incoming 8 Mb/s channels $11_1$ and $11_3$ extend to two code conversion and clock signal extraction circuits $12_2$ and $12_3$ which are connected to respective storage and positive stuffing circuits $13_2$ and $13_3$ the second multiplexing stage XII.

The two output terminals of the two multiplexers $4_{0,3}$ and $4_{4,7}$ transmit two synchronous filling 8 Mb/s signals and are connected to respective output terminals 13000, 13001 of a storage and positive stuffing circuit 13 of the second stage XII. Two information output terminals 13020 and 13021 of the circuit 13 and the two respective information output terminals $1302_2$, $1302_3$ of circuits $13_2$ and $13_3$ transmit four 8 Mb/s intermediate rate synchronous stuffed signals and are connected to the four information inputs $1410_0$ through $1410_3$ of the multiplexer 14 of the second stage XII. The information output of the multiplexer 14 transmits the 34 Mb/s high rate filled resulting signal and is connected to a code conversion and retiming circuit (not shown) from which extends the output digital channel 16 having a rate of 34 Mb/s.

The storage and stuffing circuits $3_0$ through $3_7$ of the first stage XI are controlled by a time base 7. The storage and stuffing circuits 13, $13_2$ and $13_3$ of the second stage XII are controlled by a time base 17.

The time base 7 comprises a 8.448 MHz clock 70, a divide-by-4 circuit 71, a divide-by-53 circuit 72 and a divide-by-4 circuit 73. The clock 70 generates the clock pulses at the nominal intermediate rate $F_s$ of the resulting multiplex signal and on the outgoing channel of one multiplexer $4_{0,3}$ or $4_{4,7}$. The three circuits or frequency dividers 71, 72 and 73 deliver pulses at frequencies assigned to the 4-bit words of a 848-bit frame, to the 212-bit sectors and to the bits of the 848-bit frame, respectively. These three pulse frequencies are applied to an address circuit 75. The output terminal 750 of the circuit 75 delivers reading control signals to the read progression input terminal $303_0$ of the storage and stuffing circuits such as $3_0$. The output terminals 753 and 754 of the address circuit 75 deliver the framing bit addresses and the service bit addresses in the 848-bit frame, or more precisely, respective signal during the time slots corresponding to positions of framing bits and service bits in the 848-bit frame. The address circuit 75 also delivers on its output terminal 752 a signal during the time-slot of a framing bit or a service bit to be inserted in the 848-bit frame. Finally, the address circuit 75 provides on the output terminal 751 a timing signal coinciding with the bit positions in the frame assigned to the stuffing indication bits. The terminal 751 is connected to the input terminal such as $304_0$ of the stuffing authorization circuits such as $33_0$ of the circuits $3_0$ through $3_7$. The output terminal 752 of the address circuit 75 is connected to AND gates such as 41 of the multiplexers $4_{0,3}$ and $4_{4,7}$ to inhibit any bit transfer from the circuits $3_0$ to $3_7$ during the insertion of framing bits or service bits. The output terminals 753 and 754 are connected to the multiplexers $4_{0,3}$ and $4_{4,7}$ to perform the insertion of the framing and service bits.

The time base 17 comprises a 34.368 MHz clock 170, a divide-by-4 circuit 171, a divide-by-96 circuit 172 and a divide-by-4 circuit 173. The clock 170 provides the clock pulses at the nominal high rate $F_s$ of the resulting multiplex signal on the outgoing channel 16 of the second multiplexing stage XII. The three circuits or frequency dividers 171, 172 and 173 deliver pulses at frequencies assigned to the 4-bit words of a 1536-bit frame, to the 384-bit sectors and to the bit of the 1536-bit frame, respectively. These three pulse frequencies are delivered to an address circuit 175. The output terminal 1750 of the circuit 175 provides reading control signals to the read progression input terminals such as 1303 and $1303_2$ of the read control circuits such as 131 and $131_2$ of circuits 13, $13_2$ and $13_3$. The address circuit 175 delivers on output terminals 1753 and 1754 to the multiplexer 14 the framing bit addresses and the service bit addresses in the 1536-bit frame during the respective time slots corresponding to positions of framing bits and service bits so as to insert these bits in the frame. The address circuit 175 provides on its output terminal 1752 to the input AND gates such as 141 of the multiplexer 14 a signal during the time slot of a framing bit or a service bit to be inserted in the 1536-bit frame. This last signal inhibits the bit transmission between the circuits 13, $13_2$ and $13_3$ and the multiplexer 14 during the insertion of a framing bit or service bit in the 1536-bit frame. A control signal is also delivered from an output terminal 1751 of the address circuit 175 to the input terminals such as 1304 and $1304_2$ of the stuffing authorization circuits such as 133 and $133_2$ of the storage and stuffing circuits 13, $13_2$ and $13_3$ during the time slots of the stuffing indication bits.

The storage and stuffing circuits 13, $13_2$ and $13_3$ of the second multiplexing stage XII receive the same signals from the time base 17 and emit stuffed digital multiplex 8 Mb/s signals having same 848-bit frame structures to the multiplexer 14. The storage and stuffing circuit 13 enables simultaneous stuffing of two incoming 8 Mb/s signals which are synchronous since these signals have been stuffed by means of the same time base 7. On the contrary, the storage and stuffing circuits such as $13_2$ and $13_3$ are assigned plesiosynchronous incoming component 8 Mb/s signals. In the case of the multiplexing of sixteen incoming component 2 Mb/s signals, the storage and stuffing circuits such as $13_2$ are not provided in accordance with this invention, the four input terminals 13000 through 13003 of the buffer store 130 and the four output terminals 13020 through 13023 of the stuffing bit insertion circuit 134 of the circuit 13 being utilized.

Figure 6:
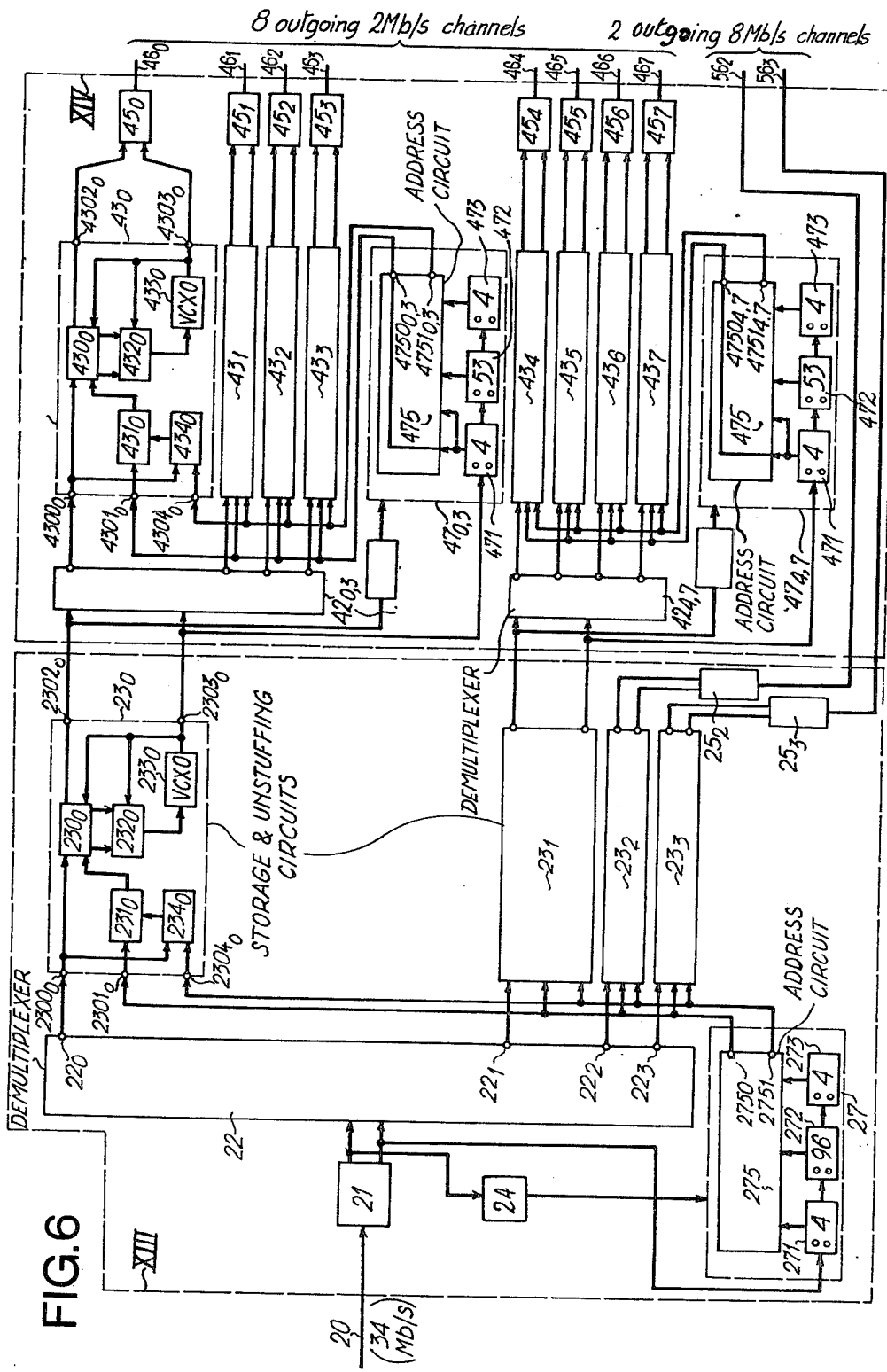
FIG. 6 shows a two-stage digital demultiplexing system embodying this invention.

FIG. 6 illustrates the demultiplexer of the system embodying the invention. As compared with the prior art demultiplexer of FIG. 2 the demultiplexer of this invention also comprises the code conversion and clock signal extraction circuit 21, the demultiplexer 22, the four storage and unstuffing circuits $23_0$ through $23_3$ and the framing signal recognition circuit 24 in the first demultiplexing stage XIII.

The timing signal output terminal of the circuit 24 is connected to a time base 27 which is similar to the time base 17 of FIG. 5. The time base 27 comprises a divide-by-4 circuit 271, a divide-by-96 circuit 272 and a divide-by-4 circuit 273 which deliver frequencies to an address circuit 275. The output terminals 2750 and 2751 of the circuit 275 correspond to the terminals 1750 and 1751 of the circuit 175. The terminal 2750 is connected to the write-in progression input terminal such as $2301_0$ of the write-in control circuit such as $231_0$ of each store and stuffing circuit $23_0$ through $23_3$. The terminal 2751 is connected to the input terminal such as $2304_0$ of the stuffing recognition circuit such as $234_0$ of the circuits $23_0$ through $23_3$ to delete all the received filling bits per 1536-bit frame of which the addresses are transmitted on the output terminal 2751 of the address circuit 275.

The digital information output terminals such as $2302_0$ of the circuits $23_0$ through $23_3$ transmit to a second demultiplexing stage XIV two synchronous digital 8 Mb/s signals to be demultiplexed and two other plesiosynchronous outgoing 8 Mb/s signals which are not demultiplexed and are transmitted through code conversion and retiming circuits $25_2$ and $25_3$ of the first stage XIII. Each voltage-controlled oscillator such as $233_0$ of a storage and unstuffing circuit $23_0$ or $23_1$ which is assigned to a 8 Mb/s signal to be demultiplexed is equivalent to the 8 Mb/s clock of the time base $47_{0,3}$ or $47_{0,4}$ which is associated with the demultiplexer $42_{0,3}$ or $42_{4,7}$ in the second stage XIV.

Each time base $47_{0,3}$ or $47_{0,4}$ of this invention comprises a divide-by-4 circuit 471 which is connected to the timing signal output terminal such as $2303_0$ of the associated storage and unstuffing circuit $23_0$ or $23_1$, a divide-by-53 circuit 472, a divide-by-4 circuit 473 and an address circuit 475 which receives the frequencies from circuits 471, 472 and 473. The output terminals 4750 and 4751 of the address circuit 475 correspond to the output terminals 750 and 751 of the address circuit 75 of FIG. 5. The terminal 4750 is connected to the write-in progression input terminal such as $4301_0$ of the associated circuit $43_0$ through $43_3$ or $43_4$ through $43_7$. The terminal 4751 is connected to the input terminal such as $4304_0$ of the stuffing recognition circuit such as $4304_0$ of the associated circuit $43_0$ through $43_7$ or $43_4$ through $43_7$ to delete all the received filling bits per 848-bit frame of which the addresses are transmitted on the terminal 4751.

In the second demultiplexing stage XIV, the digital information output terminals such as $4302_0$ of the eight storage and unstuffing circuits $43_0$ through $43_7$ transmit eight outgoing plesiosynchronous component 2 Mb/s signals and are connected to the eight code conversion and retiming circuits $45_0$ through $45_7$ respectively which receive from the associated controlled-voltage oscillator such as $433_0$ via the terminal such as $4303_0$ the 2 Mb/s clock signal. Eight outgoing digital 2,048 Mb/s channels $46_0$ through $46_7$ extend from the code conversion and retiming circuits $45_0$ through $45_7$ respectively. Two outgoing digital 8 Mb/s channels $56_2$ and $56_3$ extend from the code conversion and retiming circuits $25_2$ and $25_3$.

Figure 7:
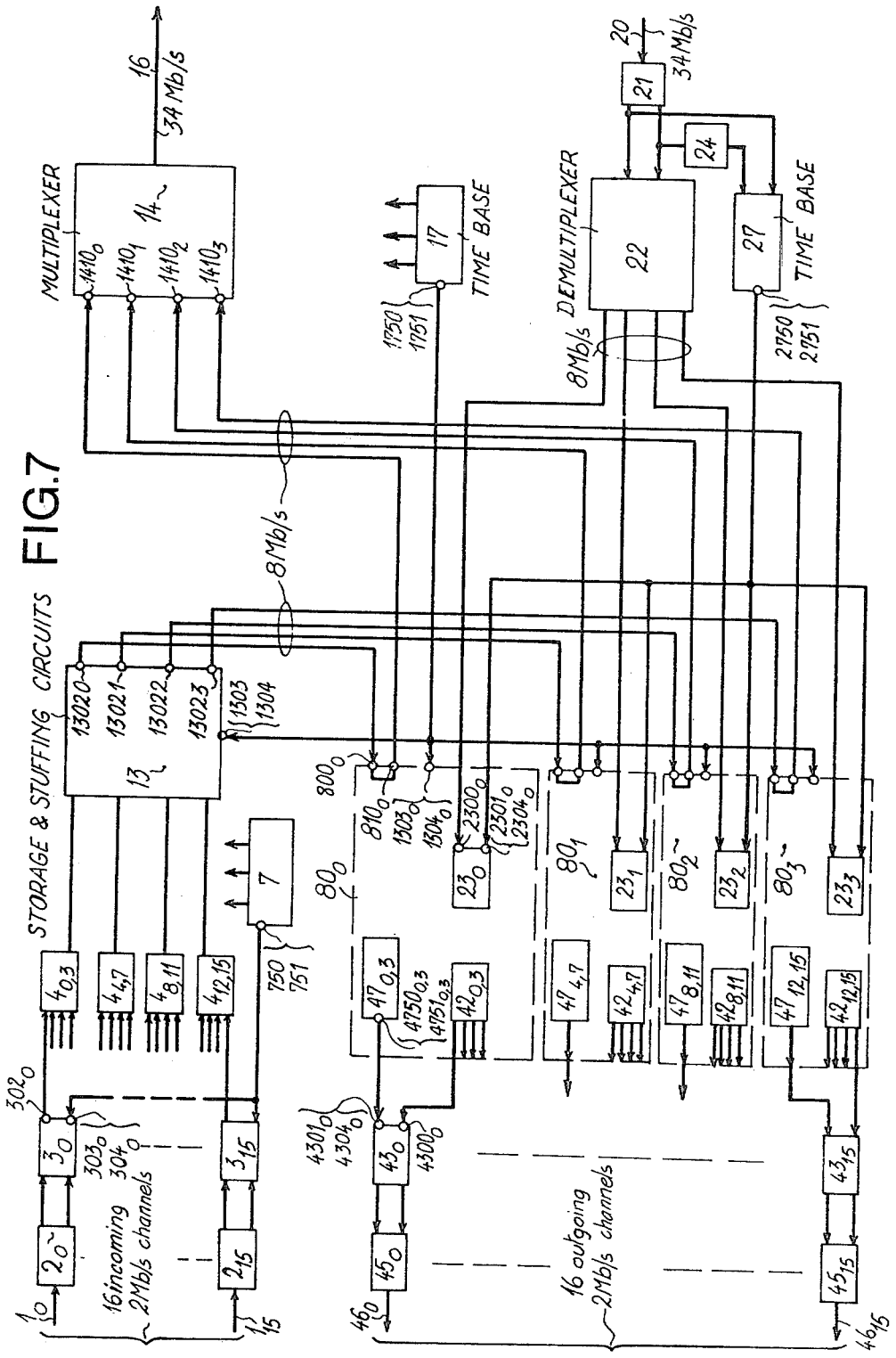
FIG. 7 is a schematic block diagram illustrating a two-stage system for multiplexing and demultiplexing sixteen digital component 2 Mb/s signals into a digital resulting 34 Mb/s signal according to this invention.

As shown in FIG. 7, in the case of sixteen plesiosynchronous incoming digital 2,048 Mb/s channels $1_0$ through $1_{15}$ to be multiplexed into an outgoing digital 34 Mb/s channel 16 and an incoming digital 34 Mb/s channel 20 to be demultiplexed into sixteen plesiosynchronous incoming digital 2,048 Mb/s channels $46_0$ through $46_{15}$, the storage and unstuffing circuit $23_i$, the demultiplexer $424_{i,4i+3}$ and the time base $474_{i,4i+3}$ which are associated to four outgoing digital 2 Mb/s channels $46_{4i}$ through $46_{4i+3}$ are disposed on a common card $80_i$. The four stuffed outgoing digital 8 Mb/s signals are transmitted from the storage and stuffing circuit 13 to the multiplexer 14 of the second multiplexing stage XII via the respective card $80_0$ through $80_3$. Thus the output terminal 1302i of the circuit 13 is connected to the input access terminal $800_i$ of the card $80_i$ and the output access terminal $810_i$ of the card $80_i$ is connected to the digital information input terminal $1410_i$ of the multiplexer 14, the card $80_i$ performing a single by-pass conductor between the access terminal $800_i$ and $810_i$.

Figure 8:
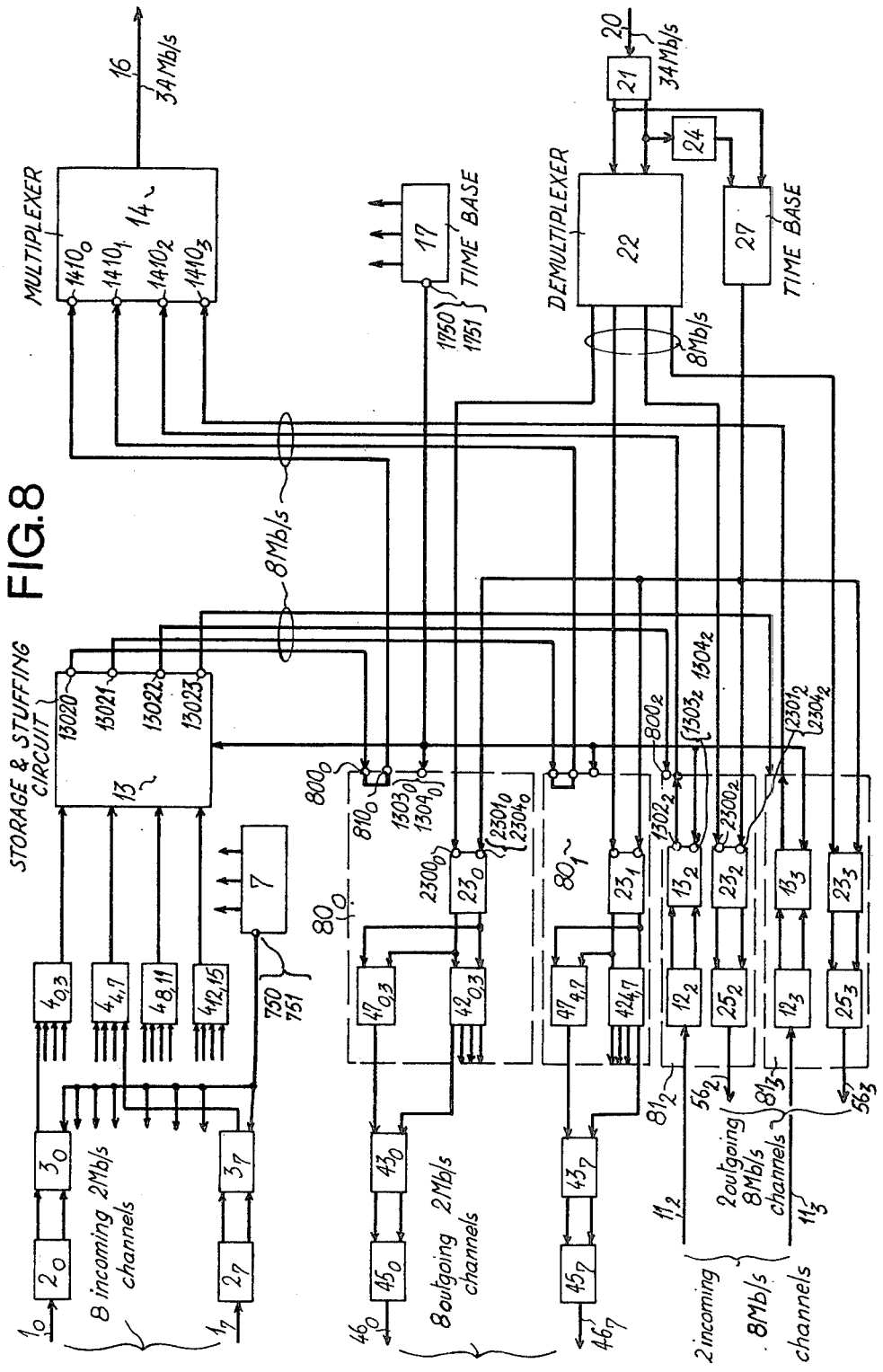
FIG. 8 is a schematic block diagram illustrating a two-stage system for multiplexing and demultiplexing eight digital component 2 Mb/s signals and two digital component 8 Mb/s signals into a digital resulting 34 Mb/s signal.

In referring to FIG. 8 which concerns the multiplexing of eight plesiosynchronous incoming digital 2,048 Mb/s channels $1_0$ through $1_7$ and two plesiosynchronous incoming digital 8 Mb/s channels $11_2$ and $11_3$ into an outgoing digital 34 Mb/s channel 16 and the demultiplexing of an incoming digital 34 Mb/s channel 20 into eight plesiosynchronous incoming channels $46_0$ through $46_7$ and two plesiosynchronous incoming channels $56_2$ and $56_3$, the code conversion and timing or retiming circuits $12_j$ and $25_j$ and the storage and stuffing or unstuffing $13_j$ and $23_j$ which are associated with incoming and outgoing 8 Mb/s channels $11_j$ and $56_j$ are also disposed on a common card $81_j$. Four cards of this type are furthermore included in a multiplexing and demultiplexing system embodying this invention which is associated with four plesiosynchronous bidirectional 8 Mb/s channels. To replace a group of four plesiosynchronous bidirectional 2 Mb/s channels by a bidirectional 8 Mb/s channel in the resulting 34 Mb/s signal, it suffices to replace a card $80_i$ by a card $81_j$. These two card types have a same interface with the circuits 14, 17, 22 and 27.

When a card $81_j$ is used, the link between the output terminal 1302j of the storage and stuffing circuit 13 and the input terminal $1420_j$ of the multiplexer 14 is cut off. In contrast, on the card $80_j$ the access terminal $810_j$ is connected to the associated output terminal 1302j of the storage and stuffing circuit 13. Thus the multiplexer 14 receives on its digital information input terminal $1410_j$ the stuffed incoming 8 Mb/s signal from the incoming channel $11_j$. At the demultiplexing, the unstuffed outgoing 8 Mb/s signal from the associated storage and unstuffing circuit $23_j$ is transmitted into the code conversion and retiming circuit $25_j$ and therefore there is not demultiplexing of the associated unstuffed 8 Mb/s signal.

Although the invention has been described in accordance with particular embodiments and with reference to specific digital rates, variants which can readily be divised by the shilled addressee are of course possible and fall within the invention as defined by the appended claims.

What we claim is:

1. A digital multiplexing and demultiplexing system in which incoming plesiosynchronous signals are time multiplexed bit by bit into synchronous intermediate rate signals and a number of incoming plesiosynchronous intermediate rate signals are time multiplexed bit by bit with said synchronous intermediate rate signals into an outgoing signal high rate signal having a high rate which is a multiple of the originating intermediate rates, said plesiosynchronous low rate signals and said plesiosynchronous intermediate rate signals comprising only information bits and said synchronous intermediate rate signals and said high rate signal comprising information bits, stuffing bits and filling bits including framing bits, service bits and stuffing indication bits arranged in predetermined bit positions in frames, the system comprising;

(a) first means for storing and stuffing said incoming plesiosynchronous low rate component signals in dependence upon the difference between their own originating respective low rates and said predetermined low rate;

(b) multiplexing means receiving and multiplexing said predetermined low rate stuffed signals into frames of said synchronous intermediate rate signals;

(c) means for filling into said synchronous intermediate rate signals a first number of filling bits of predetermined addresses of the frame forming synchronous intermediate rate filled signals;

(d) second means for storing said synchronous intermediate rate filled signals and third means for storing said incoming plesiosynchronous intermediate rate component signals;

(e) second means for stuffing said stored synchronous intermediate rate filled signals and third means for stuffing said stored plesiosynchronous intermediate rate component signals in dependence upon the difference between the originating intermediate rates and said predetermined intermediate rate;

(f) multiplexing means connected to said second and third stuffing means for multiplexing the predetermined intermediate rate stuffed signals into frames of the high rate signals;

(g) means for filling into said high rate signal a second number of filling bits in bit positions of predetermined addresses of the frame thereof and thereby forming a high rate filled signals;

(h) first demultiplexing means receiving and demultiplexing said high rate filled signal into first and second numbers of synchronous intermediate rate signals;

(i) first storing and unstuffing means for storing the first number of synchronous intermediate rate demultiplexed signals and for extracting filling bits of predetermined addresses of high rate signal frame and for unstuffing into synchronous intermediate rate filled signals;

(j) second storing and unstuffing means for storing the second number of synchronous intermediate rate demultiplexed signals for extracting filling bits of predetermined addresses of high rate signal frames and for unstuffing into outgoing plesiosynchonous intermediate rate component signals;

(k) second demultiplexing means receiving and demultiplexing said synchronous intermediate rate filled signals read out of said first storing and unstuffing means into synchronous low rate singnals;

(l) third storing and unstuffing means for storing synchronous low rate signals and for extracting filling bits of predetermined addresses of intermediate rate signal frames and for unstuffing into outgoing plesiosynchronous low rate component signals;

(m) interchangeable assembling means for replacing a group of incoming and outgoing plesiosynchronous low rate component signals by two incoming and outgoing plesiosynchonous intermediate rate component signals in said high rate filled signal; and (n) said assembling means including separate storing means for incoming low rate signals and for intermediate rate signals and further including interconnecting mean between said separate storing mean and said first, second and third storing and unstuffing means.

* * * * *